US011936215B2

(12) United States Patent
Jin

(10) Patent No.: US 11,936,215 B2
(45) Date of Patent: Mar. 19, 2024

(54) APPARATUS AND METHOD FOR TRANSMITTING POWER WIRELESSLY

(71) Applicant: HITACHI-LG DATA STORAGE KOREA, INC., Seoul (KR)

(72) Inventor: Cheol Jin, Seoul (KR)

(73) Assignee: HITACHI-LG DATA STORAGE KOREA, INC., Seoul (KR)

(*) Notice: Subject to any disclaimer, the term of this patent is extended or adjusted under 35 U.S.C. 154(b) by 0 days.

(21) Appl. No.: 17/968,466

(22) Filed: Oct. 18, 2022

(65) Prior Publication Data

US 2023/0118923 A1 Apr. 20, 2023

(30) Foreign Application Priority Data

Oct. 19, 2021 (KR) .................. 10-2021-0139072

(51) Int. Cl.
*H02J 50/90* (2016.01)
*H02J 7/00* (2006.01)
*H02J 50/10* (2016.01)

(52) U.S. Cl.
CPC ............ *H02J 50/90* (2016.02); *H02J 7/0048* (2020.01); *H02J 7/007188* (2020.01); *H02J 50/10* (2016.02); *H02J 2207/20* (2020.01)

(58) Field of Classification Search
CPC ..................................................... H02J 50/90
See application file for complete search history.

(56) References Cited

U.S. PATENT DOCUMENTS

| 9,276,414 B2 | 3/2016 | Park et al. |
| 10,110,030 B1 | 10/2018 | Colosimo et al. |
| 2013/0214591 A1* | 8/2013 | Miller .................. B60L 53/126 307/104 |
| 2015/0372493 A1* | 12/2015 | Sankar .................. H02J 50/60 307/104 |
| 2016/0099604 A1 | 4/2016 | Von Novak, III et al. |
| 2019/0222073 A1 | 7/2019 | Lee et al. |

(Continued)

FOREIGN PATENT DOCUMENTS

| JP | 2017-534234 A | 11/2017 |
| KR | 10-1815323 B1 | 1/2018 |

(Continued)

*Primary Examiner* — Daniel Kessie
(74) *Attorney, Agent, or Firm* — Birch, Stewart, Kolasch & Birch, LLP

(57) ABSTRACT

The method for transmitting power wirelessly according to an embodiment may comprise checking a position of a receiving device while wirelessly transmitting power to the receiving device, and changing a charging stop level which is compared with power loss which corresponds to a difference between transmitted power transmitted to the receiving device and received power received by the receiving device when the receiving device is outside a charging area. The receiving device is outside the charging area may be determined based on that the received power is equal to or greater than reference power and a power control level when transmitting the power to the receiving device is equal to or greater than a reference value. The charging stop level may be returned to an original value when the power loss is lower than the changed charging stop level until a predetermined time elapses after changing the charging stop level.

6 Claims, 8 Drawing Sheets

(56) References Cited

U.S. PATENT DOCUMENTS

| | | | |
|---|---|---|---|
| 2019/0260241 A1 | 8/2019 | Park | |
| 2020/0083754 A1* | 3/2020 | Tian | H02J 50/10 |
| 2021/0036550 A1* | 2/2021 | Ha | H02J 50/10 |
| 2022/0045556 A1* | 2/2022 | Lee | H04B 5/0037 |
| 2022/0190643 A1* | 6/2022 | Grellat | H02J 50/80 |

FOREIGN PATENT DOCUMENTS

| | | |
|---|---|---|
| KR | 10-2019-0000363 A | 1/2019 |
| KR | 10-2019-0087033 A | 7/2019 |
| KR | 10-2019-0118129 A | 10/2019 |
| KR | 10-2021-0014906 A | 2/2021 |

* cited by examiner

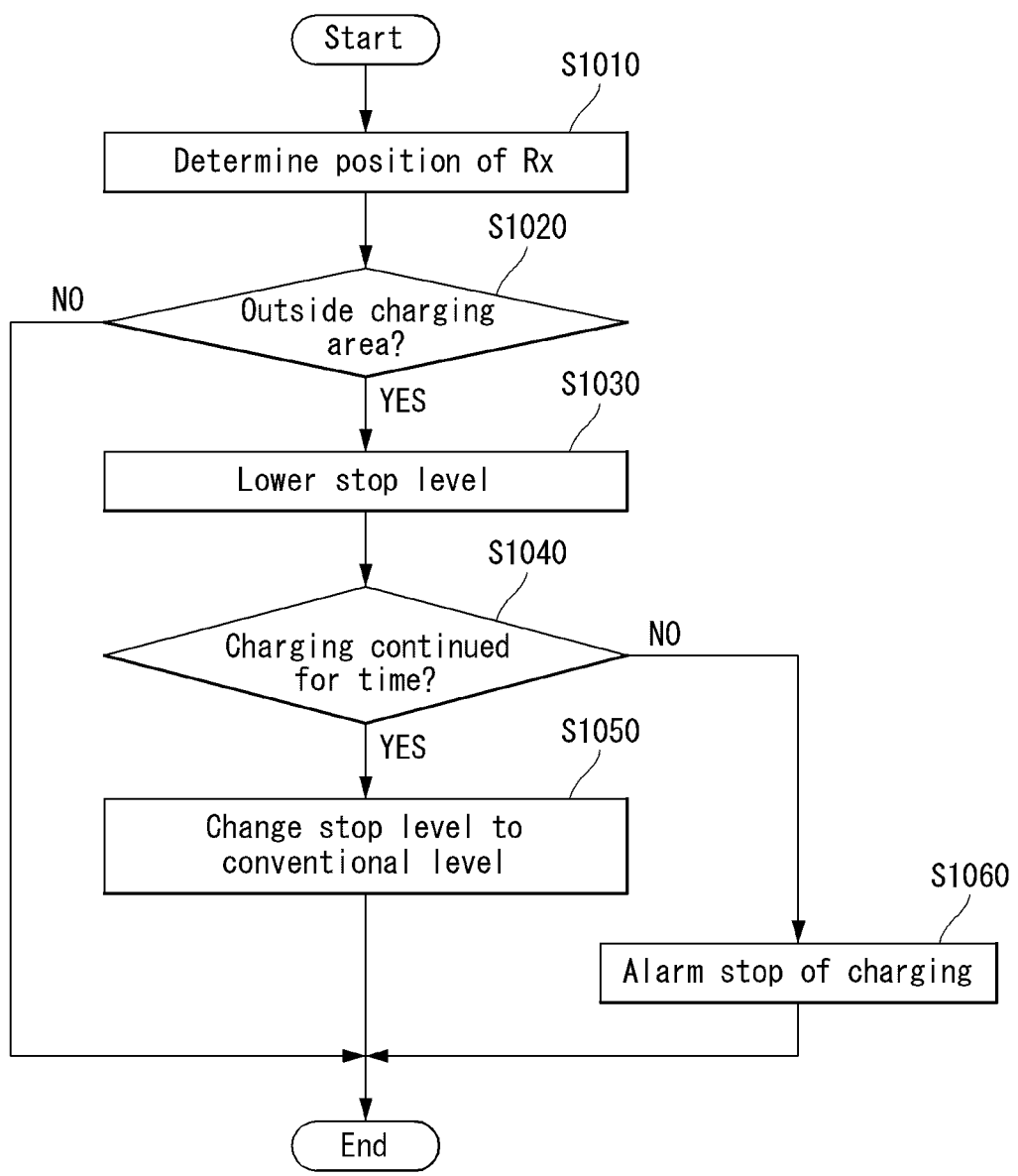

APPARATUS AND METHOD FOR TRANSMITTING POWER WIRELESSLY

This application claims the benefit of priority under 35 U.S.C. § 119(a) to Korean Patent Application No. 10-2021-0139072 filed on Oct. 19, 2021, which is incorporated by reference herein in its entirety.

BACKGROUND

Field

This disclosure relates to an apparatus and method for transmitting power wirelessly, and more particularly to a method for hastily terminating power transmission when a receiving device is placed outside a charging area and it is difficult to proceed with power transmission.

Related Art

With the development of communication and information processing technology, use of smart terminals such as a smart phone and the like has gradually increased and at present, a charging scheme generally applied to the smart terminals is a scheme that directly connects an adapter connected to a power supply to the smart terminal to charge the smart phone by receiving external power or connects the adapter to the smart terminal through a USB terminal of a host to charge the smart terminal by receiving USB power.

In recent years, in order to reduce inconvenience that the smart terminal needs to be directly connected to the adapter or the host through a connection line, a wireless charging scheme that wirelessly charges a battery by using magnetic coupling without an electrical contact has been gradually applied to the smart terminal.

There are several methods for wirelessly supplying or receiving electrical energy, representatively, an inductive coupling method based on electromagnetic induction and a resonance coupling method (that is electromagnetic resonance coupling method) based on an electromagnetic resonance phenomenon using a wireless power signal of a specific frequency.

In both methods, it is possible to secure stability of power transmission and increase transmission efficiency by exchanging data through the communication channel formed between a wireless charging apparatus and an electronic device such as a smart terminal. The inductive coupling method has a problem in that the transmission efficiency is lowered by the movement of the power receiving device while wirelessly receiving power, and the resonant coupling method has a problem in that power transmission is interrupted due to noise occurring in the communication channel.

When the receiving device attempts to charge outside the charging area of the transmitting apparatus, that is, if the user fails to match the smart terminal to the charging area of the charger and charging proceeds while placing it at the edge of the charging area, charging may not proceed properly. In this case, a user who expects the smart terminal to be charged after a certain amount of time has elapsed may check the fact that the smart terminal is not charged and suffer disappointment.

SUMMARY

This disclosure has been made in view of this situation, and an object of this disclosure is to provide a method for quickly terminating charging so that a user can change the position of the receiving device when the charging is attempted while the receiving device is placed outside a charging area.

The method for transmitting power wirelessly according to an embodiment of this disclosure may comprise checking a position of a receiving device while wirelessly transmitting power to the receiving device, and changing a charging stop level which is compared with power loss which corresponds to a difference between transmitted power transmitted to the receiving device and received power received by the receiving device when the receiving device is outside a charging area.

The wireless power transmitting apparatus according to another embodiment of this disclosure may comprise a power conversion unit including a buck converter for changing a voltage of DC power, an inverter for converting the DC power the voltage of which is changed into an AC power, and a resonance circuit including a primary coil for transmitting power by magnetic induction coupling with a secondary coil of a receiving device, and a control unit configured to check a position of the receiving device while wirelessly transmitting power to the receiving device by controlling the power conversion unit, and change a charging stop level which is compared with power loss which corresponds to a difference between transmitted power transmitted to the receiving device and received power received by the receiving device when the receiving device is outside a charging area.

Therefore, by stopping charging when the charging is attempted outside a charging area, it is possible to guide the user to change the terminal location to try charging again. In addition, when charging is started and charging continues for a certain period of time, the user can expect 100% full charging.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 10 shows an operation flow diagram for a method of wirelessly transmitting power while adjusting the charging stop level according to an embodiment of this disclosure.

DETAILED DESCRIPTION

Hereinafter, an embodiment of an apparatus and method for transmitting power wirelessly will be described in detail with reference to the accompanying drawings.

Figure 1:
FIG. 1 conceptually illustrates that power is wirelessly transmitted from a power transmitting apparatus to an electronic device, FIG. 2 conceptually illustrates a circuit configuration of a power conversion unit of a transmitting module for wirelessly transmitting power in an electromagnetic induction scheme.

FIG. 1 conceptually illustrates that power is wirelessly transmitted from a wireless power transmitting apparatus to an electronic device.

The wireless power transmitting apparatus 1 may be a power transferring apparatus wirelessly transferring power required by a wireless power receiving apparatus or an electronic device 2, or a wireless charging apparatus for charging a battery by wirelessly transferring power. Or the wireless power transmitting apparatus 1 may be implemented by one of various types of apparatuses transferring power to the electronic device 2 requiring power with non-contact.

The electronic device 2 may be operable by wirelessly receiving power from the wireless power transmitting apparatus 1 and charge a battery by using wirelessly received power. The electronic device that wirelessly receives power may include portable electronic devices, for example, a smart phone, a tablet computer, a multimedia terminal, an input/output device such as a keyboard, a mouse, a video or audio auxiliary device, a secondary battery, and the like.

Power may be wirelessly transmitted by an inductive coupling scheme based on an electromagnetic induction phenomenon by a wireless power signal generated by the wireless power transmitting apparatus 1. That is, resonance is generated in the electronic device 2 by the wireless power signal transmitted by the wireless power transmitting apparatus 1 and power is transferred from the wireless power transmitting apparatus 1 to the electronic device 2 without contact by the resonance. A magnetic field is changed by an AC current in a primary coil and current is induced to a secondary coil by the electromagnetic induction phenomenon to transfer power.

When the intensity of the current that flows on a primary coil of the wireless power transmitting apparatus 1 is changed, the magnetic field passing through the primary coil (or a transmitting Tx coil or a first coil) is changed by the current and the changed magnetic field generates induced electromotive force at a secondary coil (or a receiving Rx coil or a second coil) in the electronic device 2.

When the wireless power transmitting apparatus 1 and the electronic device 2 are disposed such that the transmitting coil at the wireless power transmitting apparatus 1 and the receiving coil at the electronic device 2 come close to each other and the wireless power transmitting apparatus 1 controls the current of the transmitting coil to be changed, the electronic device 2 may supply power to a load such as a battery by using the electromotive force induced to the receiving coil.

Efficiency of the wireless power transmission based on the inductive coupling scheme is influenced by a layout and a distance between the wireless power transmitting apparatus 1 and the electronic device 2. The wireless power transmitting apparatus 1 is configured to include a flat interface surface and a transmitting coil is mounted on the bottom of the interface surface and one or more electronic devices may be laid on the top of the interface surface. By making the gap between the transmitting coil mounted on the bottom of the interface surface and the receiving coil positioned on the top of the interface surface sufficiently small, the efficiency of the wireless power transmission by the inductive coupling method can be increased.

A mark indicating a location where the electronic device is to be laid may be displayed on the top of the interface surface of the wireless power transmitting apparatus. The mark may indicate the position of the electronic device which makes the arrangement between the primary coil mounted on the bottom of the interface surface and the secondary coil suitable. A protruded structure for guiding the location of the electronic device may be formed on the top of the interface surface. And a magnetic body may be formed on the bottom of the interface surface so that the primary coil and the secondary coil can be guided by an attractive force with a magnetic body of the other pole provided inside the electronic device.

Figure 2:
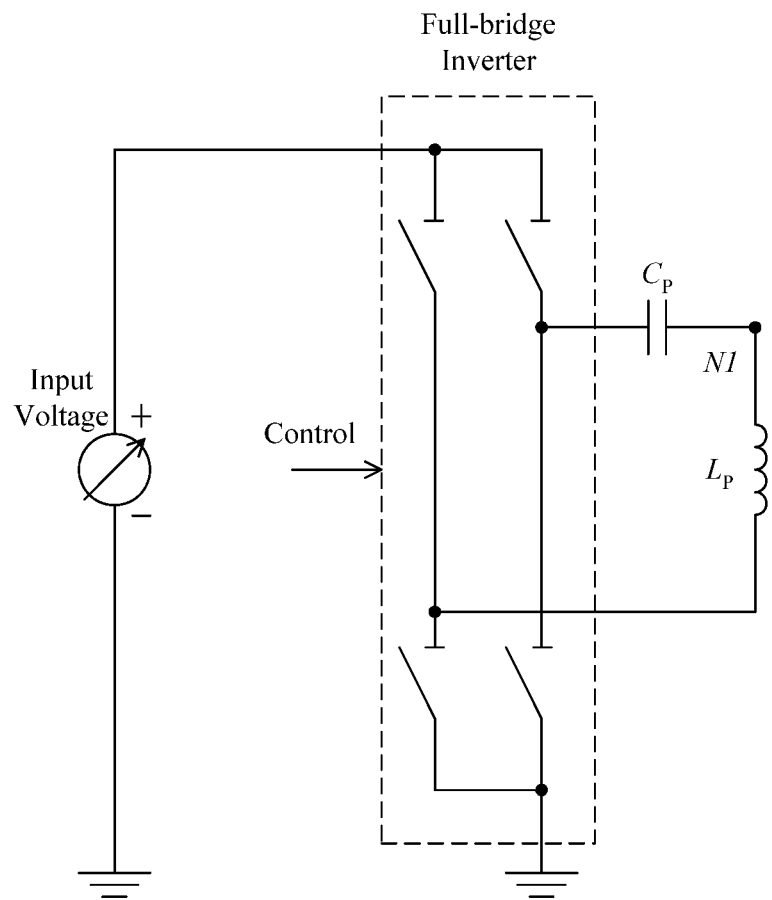

FIG. 2 conceptually illustrates a circuit configuration of a power conversion unit of a transmitting module for wirelessly transmitting power in an electromagnetic induction scheme.

The wireless power transmitting module may include a power conversion unit generally including a power source, an inverter, and a resonance circuit. The power source may be a voltage source or a current source and the power conversion unit converts the power supplied from the power source into a wireless power signal and transfers the converted wireless power signal to a power receiving module. The wireless power signal is formed in the form of the magnetic field or an electronic magnetic field having a resonance characteristic. And, the resonance circuit includes a coil generating the wireless power signal.

The inverter converts a DC input into an AC waveform having a desired voltage and a desired frequency through switching elements and a control circuit. And, in FIG. 2 a full-bridge inverter is illustrated and other types of inverters including a half-bridge inverter, and the like are also available.

The resonance circuit includes a primary coil $L_p$ and a capacitor $C_p$ to transmit power based on a magnetic induction scheme. The coil and the capacitor determine a basic resonance frequency of power transmission. The primary coil forms the magnetic field corresponding to the wireless power signal with a change of current and may be implemented in a flat form or a solenoid form.

The AC current converted by the inverter drives the resonance circuit, and as a result, the magnetic field is formed in the primary coil. By controlling the on/off timings of included switches, the inverter generates AC having a frequency close to the resonance frequency of the resonance circuit to increase transmission efficiency of the transmitting module. The transmission efficiency of the transmitting module may be changed by controlling the inverter.

Figure 3:
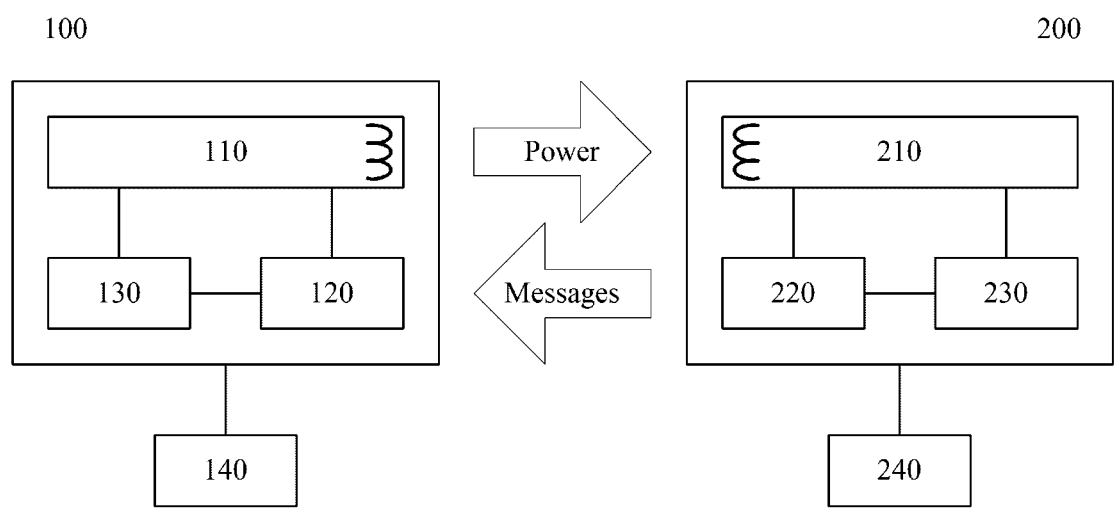
FIG. 3 illustrates a configuration for a wireless power transmitting module and a wireless power receiving module to send and receive power and messages.

FIG. 3 illustrates a configuration for a wireless power transmitting module and a wireless power receiving module to send and receive power and messages.

Since the power conversion unit just transmits power unilaterally regardless of a receiving state of the receiving module, a configuration for receiving feedback associated with the receiving state from the receiving module is required in the wireless power transmission module in order to transmit power in accordance with the state of the receiving module.

The wireless power transmitting module 100 may include a power conversion unit 110, a communication unit 120, a control unit 130, and a power supply unit 140. And, the wireless power receiving module 200 may include a power receiving unit 210, a communication unit 220, and a control unit 230 and may further include a load 240 (or a power supply unit) to which received power is to be supplied. The load 240 may include a charging unit for charging an internal battery with power supplied from the power receiving unit 210.

The power conversion unit 110 includes the inverter and the resonance circuit of FIG. 2 and may further include a circuit to control characteristics including a frequency, voltage, current, and the like used to form the wireless power signal.

The communication unit 120, connected to the power conversion unit 110, may demodulate the wireless power signal modulated by the receiving module 200 wirelessly receiving power from the transmitting module 100 in the magnetic induction scheme, thereby detecting a power control message.

The control unit 130 determines one or more characteristics among an operating frequency, voltage, and current of the power conversion unit 110 based on the message detected by the communication unit 120 and controls the power conversion unit 110 to generate the wireless power signal suitable for the message. The communication unit 120 and the control unit 130 may be configured as one module.

The power receiving unit 210 may include a matching circuit, including the secondary coil and a capacitor, which generates the inductive electromotive force according to the change of the magnetic field generated from the primary coil of the power conversion unit 110, and may further include a rectification circuit that rectifies the AC current that flows on the secondary coil to output DC current.

The communication unit 220, connected to the power receiving unit 210, may change the wireless power signal between the transmitting module and the receiving module by adjusting the load of the power receiving unit in accordance with a method of adjusting a resistive load at DC and/or a capacitive load at AC to transmit the power control message to the transmitting module.

The control unit 230 of the receiving module controls individual components included in the receiving module. The control unit 230 may measure an output of the power receiving unit 210 in a current or voltage form and control the communication unit 220 based on the measured output to transfer the power control message to the wireless power transmitting module 100. The message may direct the wireless power transmitting module 100 to start or terminate the transmission of the wireless power signal and to control characteristics of the wireless power signal.

The wireless power signal formed by the power conversion unit 110 is received by the power receiving unit 210, and the control unit 230 of the receiving module controls the communication unit 220 to modulate the wireless power signal. The control unit 230 may perform a modulation process to change the amount of power received from the wireless power signal by changing the reactance of the communication unit 220. When the amount of power received from the wireless power signal is changed, a current and/or voltage of the power conversion unit 110 forming the wireless power signal is also changed and the communication unit 120 of the wireless power transmitting module 100 may sense the change in the current and/or voltage of the power conversion unit 110 and perform a demodulation process.

The control unit 230 generates a packet including a message to be transferred to the wireless power transmitting module 100 and modulates the wireless power signal to include the generated packet. The control unit 130 may acquire the power control message by decoding the packet extracted through the communication unit 120. The control unit 230 may transmit a message for requesting a change of the characteristic of the wireless power signal based on the amount of power received through the power receiving unit 210 in order to control to-be-received power.

Figure 4:
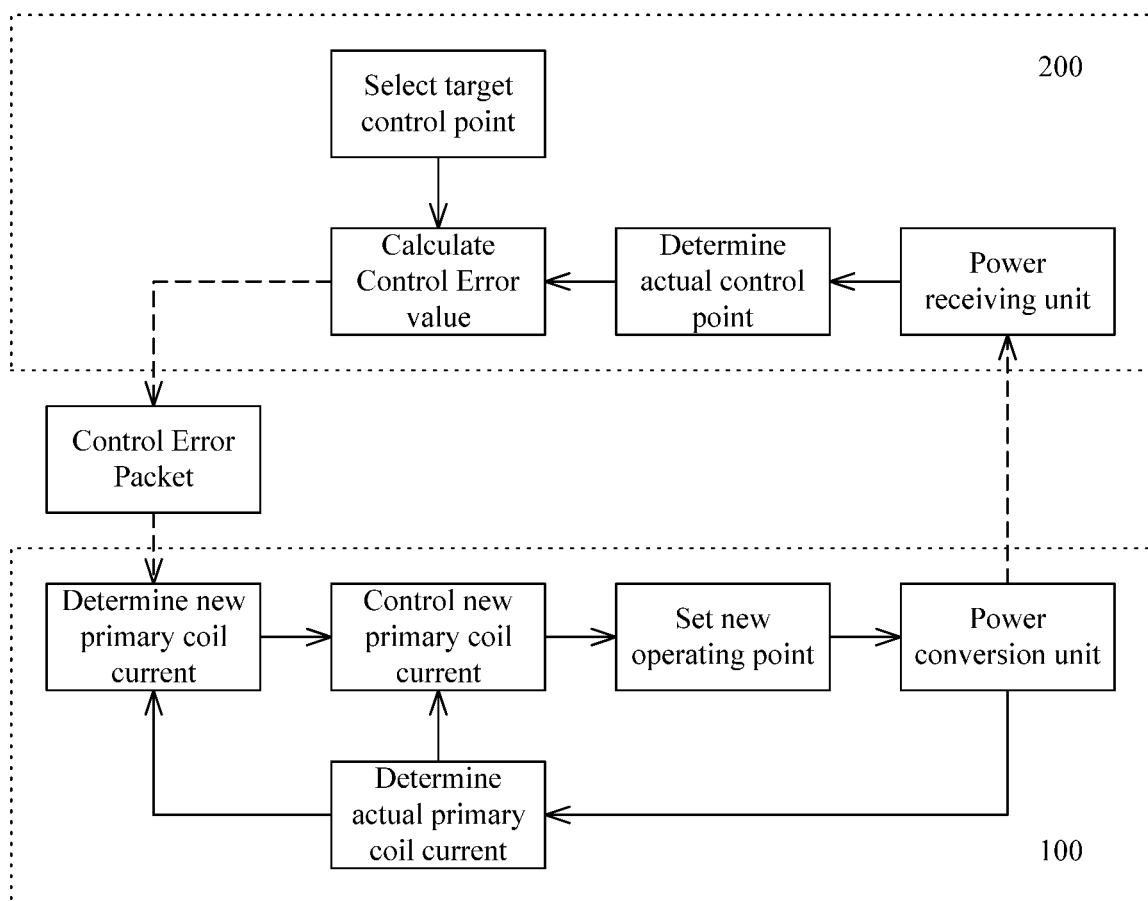
FIG. 4 is a block diagram of a loop for controlling power transmission between a wireless power transmitting module and a wireless power receiving module.

FIG. 4 is a block diagram of a loop for controlling power transmission between a wireless power transmitting module and a wireless power receiving module.

Current is induced in the power receiving unit 210 of the receiving module 200 according to the change of the magnetic field generated by the power conversion unit 110 of the transmitting module 100 and power is transmitted. The control unit 230 of the receiving module selects a desired control point, that is, a desired output current and/or voltage and determines an actual control point of the power received through the power receiving unit 210.

The control unit 230 calculates a control error value by using the desired control point and the actual control point while the power is transmitted and may take the difference between, for example, two output voltages or two output currents as the control error value. When less power is required to reach the desired control point, the control error value may be determined to be, for example, a minus value, and when more power is required to reach the desired control point, the control error value may be determined to be a plus value. The control unit 230 may generate a packet including the calculated control error value calculated by changing the reactance of the power receiving unit 210 with time through the communication unit 220 to transmit the packet to the transmitting module 100.

The communication unit 120 of the transmitting module detects a message by demodulating the packet included in the wireless power signal modulated by the receiving module 200 and may demodulate a control error packet including the control error value.

The control unit 130 of the transmitting module may acquire the control error value by decoding the control error packet extracted through the communication unit 120 and determine a new current value for transmitting power desired by the receiving module by using an actual current value which actually flows on the power conversion unit 110 and the control error value.

When the process of receiving the control error packet from the receiving device is stabilized, the control unit 130 of the transmitting module controls the power conversion unit 110 so that an operating point reaches a new operating point so an actual current value which flows on the primary coil becomes a new current value and a magnitude, a frequency, a duty ratio, or the like of an AC voltage applied to the primary coil becomes a new value. And, the control unit 130 controls the new operating point to be continuously maintained so as for the receiving device to additionally communicate control information or state information.

Interactions between the wireless power transmitting module 100 and the wireless power receiving module 200 may comprise four steps of selection, ping, identification and configuration, and power transfer. The selection step is a step for the transmitting module to discover an object laid on the surface of an interface. The ping step is a step for verifying whether the object includes a receiving module. The identification and configuration step is a preparation step for sending power to the receiving module during which appropriate information is received from the receiving module and a power transfer contract with the receiving module is made based on the received information. The power transfer step is a step of actually transmitting power to the receiving module wirelessly through the interaction between the transmitting module and the receiving module.

In the ping step, the receiving module 200 transmits a signal strength packet SSP indicating a magnetic flux coupling degree between a primary coil and a secondary coil through the modulation of a resonance waveform. The signal strength packet SSP is a message generated by the receiving module based on a rectified voltage. The transmitting module 100 may receive the message from the receiving module 200 and use the message to select an initial driving frequency for power transmission.

In the identification and configuration step, the receiving module 200 transmits to the transmitting module 100 an identification packet including a version, a manufacturer code, apparatus identification information, and the like of the receiving module 200, a configuration packet including information including maximum power, a power transmitting method, and the like of the receiving module 200, and the like.

In the power transmitting step, the receiving module 200 transmits to the transmitting module 100 a control error packet CEP indicating a difference between an operating point where the receiving module 200 receives a power signal and the operating point determined in the power transfer contract, a received power packet RPP indicating an average of the power which the receiving module 200 receives through the surface of the interface, and the like.

The received power packet RPP is the data about the amount of received power, which is obtained by taking a rectified voltage, a load current, an offset power, etc. of the power receiving unit 210 of the receiving device, and continuously transmitted to the transmitting module 100 while the receiving module 200 receives power. The transmitting module 100 receives the reception power packet RPP and uses it as an operation factor for power control.

The communication unit 120 of the transmitting module extracts the packets from change in resonance waveform, and the control unit 130 decodes the extracted packets to acquire the messages and controls the power conversion unit 110 based thereon to wirelessly transmit power while changing power transmission characteristics as the receiving module 200 requests.

Meanwhile, in a scheme that wirelessly transfers power based on inductive coupling, the efficiency is less influenced by frequency characteristics, but influenced by the arrangement and distance between the transmitting module 100 and the receiving module 200.

An area which the wireless power signal can reach may be divided into two. A portion of the interface surface through which a high efficiency magnetic field can pass when the transmitting module 100 wirelessly transmits power to the receiving module 200 may be referred to as an active area. An area where the transmitting module 100 can sense the existence of the receiving module 200 may be referred to as a sensing area.

The control unit 130 of the transmitting module may sense whether the receiving module is disposed in or removed from the active area or the sensing area. The control unit 130 may detect whether the receiving module 200 is disposed in the active area or the sensing area by using the wireless power signal formed in the power conversion unit 110 or using a separately provided sensor.

For example, the control unit 130 may detects whether the receiving module exists by monitoring whether the power characteristics for forming the wireless power signal is changed while the wireless power signal is being affected by the receiving module 200 existing in the sensing area. The control unit 130 may perform a process of identifying the receiving module 200 or determine whether to start wireless power transfer, according to a result of detecting the existence of the receiving module 200.

The power conversion unit 110 of the transmitting module may further include a position determination unit. The position determination unit may move or rotate the primary coil in order to increase the efficiency of the wireless power transfer based on the inductive coupling scheme and in particular, be used when the receiving module 200 does not exist in the active area of the transmitting module 100.

The position determination unit may include a driving unit for moving the primary coil so that a distance between the centers of the primary coil of the transmitting module 100 and the secondary coil of the receiving module 200 is within a predetermined range or so that the centers of the primary coil and the secondary coil overlap with each other. To this end, the transmitting module 100 may further include a sensor or a sensing unit for sensing the position of the receiving module 200. And the control unit 130 of the transmitting module may control the position determination unit based on the positional information of the receiving module 200, which is received from the sensor of the sensing unit.

Alternatively, the control unit 130 of the transmitting module may receive control information regarding the arrangement with or distance from the receiving module 200 through the communication unit 120 and control the position determination unit based on the control information.

Further, the transmitting apparatus 100 may include two or more primary coils to increase transmission efficiency by selectively using some primary coils arranged appropriately with the secondary coil of the receiving module 200 among the two or more primary coils. In this case, the position determination unit may determine which primary coils of the two or more primary coils are used for power transmission.

A single primary coil or a combination of one or more primary coils forming the magnetic field passing through the active area may be designated as a primary cell. The control unit 130 of the transmitting module may sense the position of the receiving module 200, determine the active area based on the determined active area, connect the transmitting module configuring the primary cell corresponding to the active area and control the primary coils of the transmitting module to be inductively coupled to the secondary coil of the receiving module 200.

Meanwhile, since the receiving module 200 is embedded in a smart terminal or an electronic apparatus such as a multimedia reproduction terminal or a smart phone and is laid in a direction or a location which is not constant in a vertical or horizontal direction on the surface of the interface of the transmitting module 100, the transmitting module requires a wide active area.

In case that a plurality of the primary coils are used in order to widen the active area, since a number of drive circuits equal to the number of the primary coils are required and the control over a plurality of primary coils is complicated, the cost of the transmitting module, that is, the wireless charger, is increased during commercialization. Further, in order to expand the active area, even when a scheme of changing the location of the primary coil is applied, since it is necessary to provide a transport mechanism for moving the location of the primary coil, there is a problem that a volume and a weight increase and manufacturing cost increases.

A method that extends the active area even with one primary coil of which the location is fixed is effective. However, when the size of the primary coil is just increased, a magnetic flux density per area decreases and magnetic coupling force between the primary coil and the secondary coil is weakened. As a result, the active area is not so increased as expected and the transmission efficiency is also lowered.

As such, it is important to determine an appropriate shape and an appropriate size of the primary coil in order to extend the active area and improve the transmission efficiency. A multi-coil scheme adopting two or more primary coils may be an effective method that extends the active area of the wireless power transmitting module.

Figure 5:
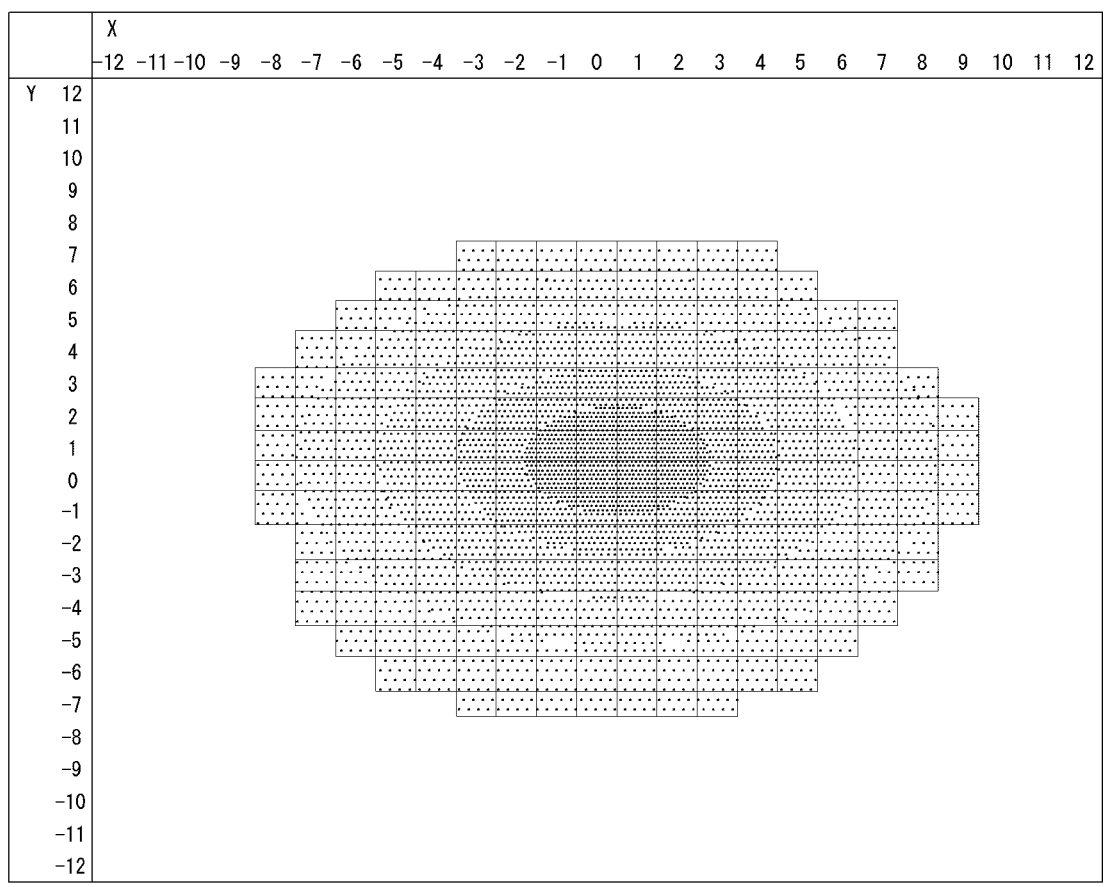
FIG. 5 shows the charging area of the transmitting apparatus.

FIG. 5 shows the charging area of the transmitting apparatus.

The wireless power transmitting apparatus, that is the charger, attempts the charging operation of supplying power to a receiving device when the receiving device is placed in an active area, and stops the charging when power loss during the charging becomes higher than a foreign object detection level. The transmitting apparatus may calculate the power loss as a difference between the transmitted power transmitted by the transmitting apparatus and the received power received by the receiving device, and confirm the received power from the received power packet transmitted by the receiving device.

In particular, the charger may cut off charging when the receiving device is placed outside the charging area so the power loss becomes higher than the foreign object detection level, and the time it takes to stop charging varies depending on the charger or the receiving device.

The charger may secure reliability for charging within the active area or charging area, but cannot guarantee 100% charging of the receiving device outside the charging area and cannot secure reliability for charging. So, when the receiving device is placed outside the charging area, it is not known when the charging will be terminated. In some cases, a terminal is placed on the charger, but even after a predetermined time has elapsed, 100% charging is not performed and charging is terminated.

Figure 6:
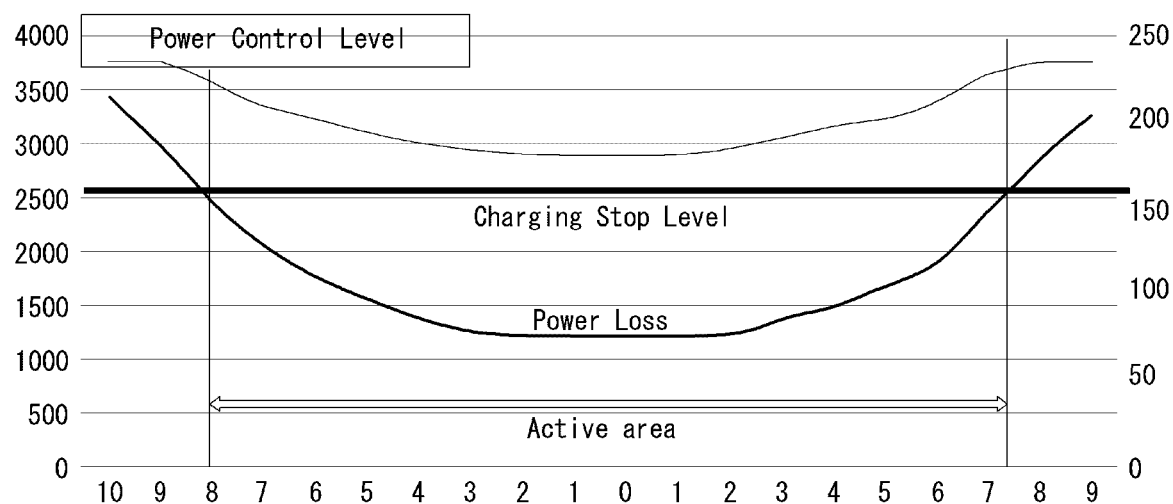
FIG. 6 shows the boundary of the charging area determined through the comparison of the power loss and the charging stop level and the change in the power control level in the charging area.

FIG. 6 shows the boundary of the charging area determined through the comparison of the power loss and the charging stop level and the change in the power control level in the charging area.

FIG. 6 shows that a receiving device is located outside the charging area when the power loss becomes higher than the charging stop level. However, it is difficult for the transmitting apparatus to accurately determine the boundary of the charging area because it is difficult to accurately calculate the power loss. In addition, since a foreign object detection level is used as the charging stop level, it is difficult to accurately determine the boundary of the charging area when there is a foreign object.

As shown in FIG. 6, since the power control level changes in proportion to the power loss to some extent according to the offset from the center of the charging area, the power control level may be used to determine the boundary of the charging area.

In consideration of this point, an embodiment according to this disclosure provides a method for accurately determining whether the receiving device is inside or outside the charging area, and a method for quickly terminating the charging operation when it is determined that the receiving device is outside the charging area.

Figure 7:
FIG. 7 is a table showing the buck duty and the control error packet according to the separation offset from the center of the charging area.

FIG. 7 is a table showing the buck duty and the control error packet according to the separation offset from the center of the charging area.

In the example of FIG. 7, the control error packet CEP is not received from a receiving device until a position spaced about 8 mm from the center of the charging area. Control error packets starts to be received from a position spaced apart by 9 mm from the center of the charging area, and the number of control error packets increases as the receiving device goes further outward.

On the other hand, the buck duty gradually increases as the receiving device moves from the center of the charging area to the outside, and the buck duty increases to a maximum value from a position spaced apart by about 9 mm.

Therefore, the transmitting apparatus may obtain the buck duty (power control level) while charging a receiving device and compare it with a reference value to determine the boundary of the charging area, and may determine that the receiving device is outside the charging area when the buck duty is equal to or greater than the reference value.

For reference, a buck converter is a type of DC-DC converter and is a circuit for stepping down a voltage, and is used to generate a voltage lower than an input voltage. A circuit that uses a Zener diode for voltage drop converts the reduced voltage into heat, resulting in lower efficiency.

However, the buck converter uses a diode and an inductor to turn on/off the circuit to regulate the voltage applied to a load. Energy is energized to the load through the diode. When turning on a loop, the buck converter stores energy in the inductor and flows current to the load, and when turning off the loop, the energy stored in the inductor is supplied to the load through the diode. The buck converter may adjust the magnitude of the output voltage or the amount of current by adjusting the on/off duty. The buck converter may be included in the power conversion unit 110 to adjust power to be supplied to the receiving device.

When the receiving device is located close to the center of the charging area, power transmission efficiency is high, so that power may be transmitted to the receiving device even when the operating voltage of the power converter is low, so that the buck duty of the buck converter may be maintained at a low value. However, when the receiving device is on the boundary of the charging area or outside the charging area, the power transmission efficiency is low, so the operating voltage of the converter must be maintained high, and for this, the buck duty is inevitably maintained high.

Figure 8:
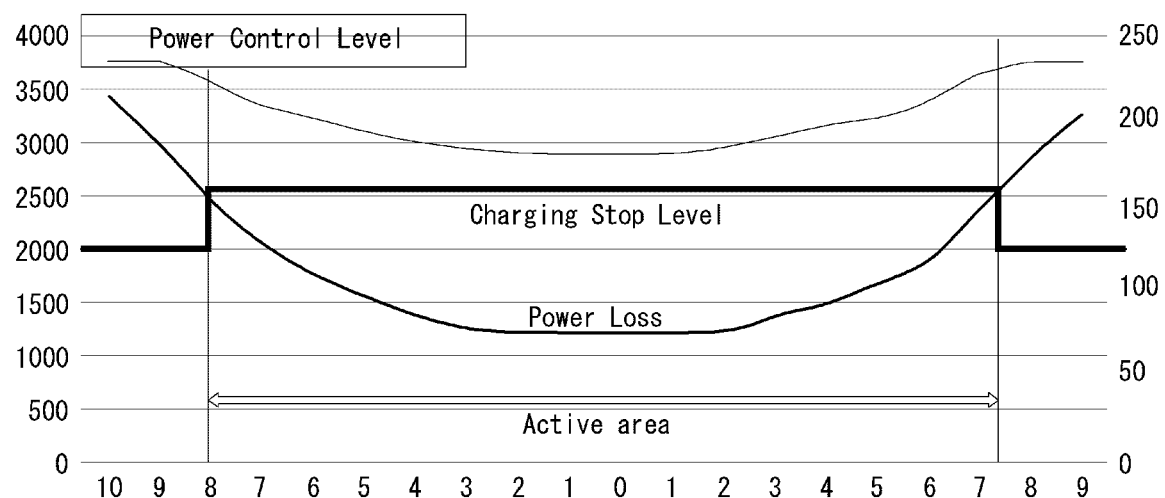
FIG. 8 is a graph showing an embodiment of down-regulating the charging stop level when a receiving device is placed outside the charging area.

FIG. 8 is a graph showing an embodiment of down-regulating the charging stop level when a receiving device is placed outside the charging area.

When the buck duty becomes greater than a reference value, the transmitting apparatus determines that the receiving device is placed on the boundary of the charging area or outside the charging area, and may adjust the charging stop level or the foreign object detection level downward as shown in FIG. 8 to stop the charging operation.

Even when the receiving device is located on the boundary of the charging area or outside the charging area, it may happen that the power loss becomes large but is similar to or lower than the charging stop level, so the charging operation is continued with a low charging efficiency, a lot of heat is generated in the charger and the receiving device, and only the charging time is longer.

In order to cope with this situation, when it is determined that the receiving device is on the boundary of the charging area or outside the charging area, the transmitting apparatus may lower the charging stop level so that the power loss becomes higher than the charging stop level, thereby stopping the charging operation quickly and reliably.

Figure 9:
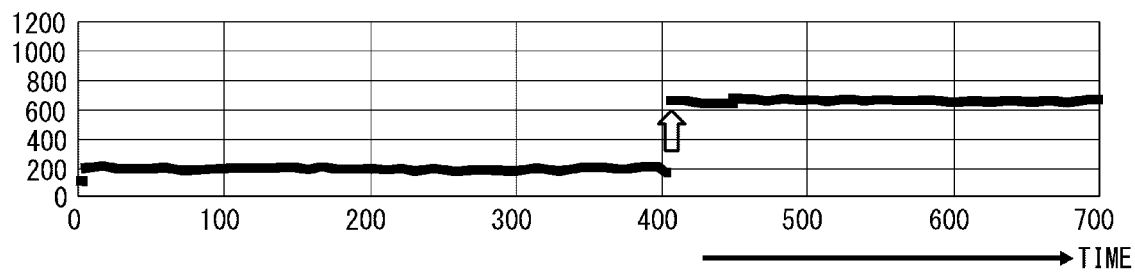
FIG. 9 is a graph showing an embodiment in which the charging stop level is changed to a previous level when charging is progressed even after the charging stop level is lowered and then a predetermined time has elapsed.

FIG. 9 is a graph showing an embodiment in which the charging stop level is changed to a previous level when charging is progressed even after the charging stop level is lowered and then a predetermined time has elapsed.

When the charging operation continues without stopping for a certain period of time even after lowering the charging stop level since it is determined that the receiving device is out of the charging area, that is when the charging operation continues since the power loss remains below the lowered charging stop level, the transmitting apparatus may determine that there is a high probability that the charging interruption does not occur, and secure a margin for power loss by increasing the charging stop level to a previous level again as shown in FIG. 9.

FIG. 10 shows an operation flow diagram for a method of wirelessly transmitting power while adjusting the charging stop level according to an embodiment of this disclosure.

The transmitting apparatus determines the location of the receiving device (receiving module) (S1010), and may determine the location of the receiving device based on the received power packet received from the receiving device and the power control level, that is the buck duty.

The transmitting apparatus determines whether the receiving device is out of the charging area while wirelessly transmitting power to the receiving device (S1020). The transmitting apparatus may determine that the receiving device is out of the charging area (or active area) when the received power confirmed from the received packet is equal to or greater than a reference power and the buck duty is equal to or greater than a reference value, otherwise determine that the receiving device is in the charging area.

For reference, when the received power checked from the received power packet is less than or equal to the reference power, the charging operation is not performed properly, so it is impossible to determine whether the receiving device is in the charging area or outside the charging area.

When the receiving device is in the charging area (NO in S1020), the transmitting apparatus performs a charging operation of wirelessly supplying power to the receiving device.

When the receiving device is outside the charging area (YES in S1020), the transmitting apparatus may adjust the charging stop level downward (S1030). The transmitting apparatus may stop charging when the power loss is higher than the charging stop level while comparing the power loss and the charging stop level.

The transmitting apparatus checks whether the charging operation is maintained until a predetermined time elapses after downwardly adjusting the charging stop level (S1040).

If the charging operation continues, that is, if the power loss remains lower than the charging stop level until a predetermined time elapses after the charging stop level is downwardly adjusted (YES in S1040), the transmitting apparatus may return the charging stop level to a previous level, that is, adjust the charging stop level upward (S1050).

Since the power loss remains lower than the charging stop level even after the charging stop level is lowered, even if the charging stop level is changed to the previous level, the power loss is more definitely lower than the changed charging stop level, and the transmitting apparatus continues to perform the charging operation.

On the other hand, if the charging operation is stopped because the power loss becomes higher than the charging stop level before a predetermined time elapses after the charging stop level is adjusted downward (NO in S1040), the transmitting apparatus may notify the user that charging has been stopped through a display or a buzzer equipped on the interface surface (S1060).

Therefore, when the receiving device is placed on the boundary of the charging area or outside the charging area, it is possible to quickly stop charging and notify the user of this so that the user can change the location of the receiving device. In addition, it allows users to expect 100% full charge when charging starts and charging continues for more than a certain amount of time.

The method and apparatus for transmitting power wirelessly in this disclosure may be described as follows.

The method for transmitting power wirelessly according to an embodiment may comprise checking a position of a receiving device while wirelessly transmitting power to the receiving device, and changing a charging stop level which is compared with power loss which corresponds to a difference between transmitted power transmitted to the receiving device and received power received by the receiving device when the receiving device is outside a charging area.

In an embodiment, the checking may determine that the receiving device is outside the charging area based on that the received power is equal to or greater than reference power and a power control level when transmitting the power to the receiving device is equal to or greater than a reference value.

In an embodiment, a buck duty of a buck converter included in a power conversion unit may be used as the power control level.

In an embodiment, the changing may adjust the charging stop level downwardly when the receiving device is outside the charging area.

In an embodiment, the transmitting of the power may be stopped when the power loss is higher than the charging stop level.

In an embodiment, it may be notified that power transmission has stopped

In an embodiment, the charging stop level may be returned to an original value when the power loss is lower than the changed charging stop level until a predetermined time elapses after changing the charging stop level.

The wireless power transmitting apparatus according to another embodiment may comprise a power conversion unit including a buck converter for changing a voltage of DC power, an inverter for converting the DC power the voltage of which is changed into an AC power, and a resonance circuit including a primary coil for transmitting power by magnetic induction coupling with a secondary coil of a receiving device, and a control unit configured to check a position of the receiving device while wirelessly transmitting power to the receiving device by controlling the power conversion unit, and change a charging stop level which is compared with power loss which corresponds to a difference between transmitted power transmitted to the receiving device and received power received by the receiving device when the receiving device is outside a charging area.

Throughout the description, it should be understood by those skilled in the art that various changes and modifications are possible without departing from the technical principles of the present invention. Therefore, the technical scope of the present invention is not limited to the detailed descriptions in this specification but should be defined by the scope of the appended claims.

What is claimed is:

1. A method for transmitting power wirelessly, comprising:
   checking a position of a receiving device while wirelessly transmitting power to the receiving device;
   adjusting a charging stop level downwardly which is compared with power loss which corresponds to a difference between transmitted power transmitted to the receiving device and received power received by the receiving device, when it is checked that the receiving device is outside a charging area based on that the received power is equal to or greater than a reference power and a power control level when transmitting the power to the receiving device is equal to or greater than a reference value;
   stopping the transmitting of the power when the power loss is higher than the charging stop level; and
   returning the adjusted charging stop level to an original value when the power loss is lower than the adjusted charging stop level until a predetermined time elapses after adjusting the charging stop level.

2. The method of claim 1, wherein a buck duty of a buck converter included in a power conversion unit is used as the power control level.

3. The method of claim 1, further comprising:
   notifying that power transmission has stopped.

4. A wireless power transmitting apparatus, comprising:
   a power conversion unit including a buck converter for changing a voltage of DC power, an inverter for converting the voltage of the DC power into an AC power, and a resonance circuit including a primary coil for transmitting power by magnetic induction coupling with a secondary coil of a receiving device; and
   a control unit configured to check a position of the receiving device while wirelessly transmitting power to the receiving device by controlling the power conversion unit, adjust a charging stop level downwardly which is compared with power loss which corresponds to a difference between transmitted power transmitted to the receiving device and received power received by the receiving device when it is checked that the receiving device is outside a charging area based on that the received power is equal to or greater than a reference power and a power control level when transmitting the power to the receiving device is equal to or greater than a reference value, stop transmitting the power when the power loss is higher than the charging stop level, and return the adjusted charging stop level to an original value when the power loss is lower than the adjusted charging stop level until a predetermined time elapses after adjusting the charging stop level.

5. The apparatus of claim 4, wherein the control unit is configured to use a buck duty of the buck converter as the power control level.

6. The apparatus of claim 4, wherein the control unit is configured to notify that power transmission has stopped by using a display or a buzzer.

* * * * *